(12) United States Patent
Varma et al.

(10) Patent No.: US 7,858,061 B2
(45) Date of Patent: Dec. 28, 2010

(54) COMPOSITIONS AND METHODS FOR REMOVING MERCURY FROM MERCURY-CONTAINING FLUIDS

(75) Inventors: Rajender S. Varma, Cincinnati, OH (US); Yuhong Ju, Cincinnati, OH (US); Subhas Sikdar, Blue Ash, OH (US); Joo Youp Lee, Cincinnati, OH (US); Timothy C. Keener, Cincinnati, OH (US)

(73) Assignee: The United States of America as represented by the Administrator of the United States Environmental Protection Agency, Washington, DC (US)

( * ) Notice: Subject to any disclaimer, the term of this patent is extended or adjusted under 35 U.S.C. 154(b) by 974 days.

(21) Appl. No.: 11/300,879

(22) Filed: Dec. 15, 2005

(65) Prior Publication Data

US 2007/0140940 A1    Jun. 21, 2007

(51) Int. Cl.
B01D 45/00    (2006.01)
(52) U.S. Cl. .................. 423/215.5; 588/313; 502/400
(58) Field of Classification Search ......... 502/405–407, 502/410, 413; 588/313, 400, 412
See application file for complete search history.

(56) References Cited

U.S. PATENT DOCUMENTS

| 3,793,185 | A  | * | 2/1974 | Whitehurst et al. ...... 208/251 R |
| 6,344,071 | B1 | * | 2/2002 | Smith et al. .................... 95/274 |
| 6,719,828 | B1 |   | 4/2004 | Lovell et al. |
| 2007/0122327 | A1 | * | 5/2007 | Yang et al. ................. 423/210 |

OTHER PUBLICATIONS

Balogh, M.; Laszlo, P. *Organic Chemistry Using Clays*. Springer: Berlin, 1993.
Chungsying, Lu et al., "Design Criteria for Electrostatic Precipitators to Collect Polydisperse Particles," 94-RA 114A.01, presented at the 87th Annual Air and Waste Management Meeting, Cincinnati, Ohio, Jun. 19-24, 1994.
Change, R. et al., in "Mercury Emission Control Technologies," Power Engineering, Nov. 1995, 51-56.
Prestbo, E. M.; Bloom, N. S. Mercury Speciation Adsorption MESA Method for Combustion Flue Gas: Methodology, Artifacts, Intercomparison, and Atmospheric Implications. *Water, Air, Soil Pollut.* 1995, 80, 145.
Sjostrom, S., J. et al., "Demonstration of Dry Carbon-Based Sorbent Injection for Mercury Control in Utility ESPs and Baghouses," 97-WA72A.07, 90th Annual Meeting of the Air and Waste Management Association, Toronto, Ontario, Canada, Jun. 8-13, 1997.

(Continued)

*Primary Examiner*—Timothy C Vanoy
*Assistant Examiner*—Richard M Rump

(57) ABSTRACT

Oxidative sorbents are provided for adsorbing elemental or oxidized mercury from mercury-containing fluids such as flue gas from a coal-burning power utility or the like at a temperature range of about 50 to 350° C. The method of preparing and using the oxidative sorbents is also provided. The oxidative sorbent compositions include one or more silicates capable of cation exchange with a plurality of active metal cations and their counter anions. The silicates may include those selected from clays such as montmorillonite, laumonite, bentonite, Mica, vermiculite and kaolinite, and from silica gels, natural and synthetic molecular sieves, zeolites, and ashes from stoker- and pulverized coal-fired boilers. The one or more oxidative metal halides and/or sulfates may be selected from the group consisting of CuCl, CuBr, $CuCl_2$, $CuBr_2$, $CuSO_4$, $FeCl_2$, $FeCl_3$, $FeSO_4$, $Fe_2(SO_4)_3$, $ZnCl_2$, $ZnBr_2$, $NiCl_2$, and $NiSO_4$. The oxidative sorbents may also include activated carbon.

18 Claims, 5 Drawing Sheets

Schematic of a lab-scale fixed-bed system for $Hg^0$ adsorption test in $N_2$ flow.

OTHER PUBLICATIONS

Butz, J. R. et al., "Use of sorbents for Air Toxics Control in a Pilot-Scale COHPAC Baghouse," 92nd Annual Meeting Air & Waste Management Association, St. Louis, Mo., Jun. 20-24, 1999.

Mercury Study Report to Congress, "VolumeVIII: An Evaluation of Mercury Control Technologies and Costs," U.S. Environmental Protection Agency, EPA452/R-97-010, Dec. 1997.

Turchi, C.; Stewart, R.M.; Broderick, T.E.; Albiston, J. Removal and Recovery of Vapor-Phase Mercury from Flue Gas Using Regenerable Sorbents. *ADA Technologies, Inc.*, 1-13.

Morency, J.R.; Panagiotou, T.; Senior, C.L. Laboratory Duct Injection of Zeolite-Based Mercury Sorbent. *Air Waste Manage. Assoc.* Jun. 2000.

Mercury Study Report to Congress; EPA 452/R-97-003; U.S. Environmental Protection Agency, Office of Air Quality Planning and Standards: Washington, DC, Dec. 1997.

Ghorishi, S. B.; Keeney, R. M.; Serre, S. D.; Gullett, B. K; Jozewicz, W. S. Development of a Cl-Impregnated Activated Carbon for Entrained Flow Capture of Elemental Mercury. *Environ. Sci. Technol*: 2002, 36, 4454.

Vidic, R. D.; Sider, D. P. Vapor-Phase Elemental Mercury Adsorption by Activated Carbon Impregnated with Chloride and Chelating Agents. *Carbon*, 2001, 39, 3.

Evans, M. J. B.; Halliop, E.; Liang, S.; McDonald, J. A. F. The Effect of Chlorine on Surface Properties of Activated Carbon. *Carbon*, 1998, 36, 1677.

Ley, T.; Ebner, T.; Slye, R. Assessment of Low-Cost Novel Sorbents for Coal Fired Power Plant Mercury Control. *Procd. of Mercury Control Technology R&D Program Review Meeting*, Pittsburgh, PA, Aug. 12-13, 2003.

Granite, E. J.; Pennline, H. W.; Hargis, R. A. Novel Sorbents for Mercury Removal from Flue Gas. *Ind. Eng. Chem. Res.* 2000, 39, 1020.

Butz, J. R.; Lovell, J. S.; Broderick, T. E.; Sidwell, R. W.; Turchi, C. S.; Kuhn, A. K. Evaluation of Amended Silicates™ Sorbents for Mercury Control. *Procd. of the US EPA/DOE/EPRI Combined Power Plant Air Pollutant Control Symposium: "Mega Symposium"*, Washington D.C., May 19-22, 2003.

Desauziers, V.; Castre, N.; LeCloirec, P. Sorption of Methylmercury by Clays and Mineral Oxides. Environ. Sc. Technol. 1997, 18, 1009.

Senior, C. L.; Sarofim, A. F.; Zeng, T.; Helble, J. J.; Mamani-Paco, R. Gas-phase Transformations of Mercury in Coal-Fired Power Plants. *Fuel Process. Technol.* 2000, 63, 197.

Mercury Information Clearinghouse. Mercury Control Field Demonstrations. Quarter 6. Apr. 2005.

Pinnavia, T. J. Intercalated Clay Catalysts. *Science* 1983, 220, 365.

Laszlo, P. Chemical Reactions on Clays. *Science* 1987, 235, 1473.

Varma, R. S. Clay and Clay-supported Reagents in Organic Synthesis. *Tetrahedron* 2002, 58, 1235.

* cited by examiner

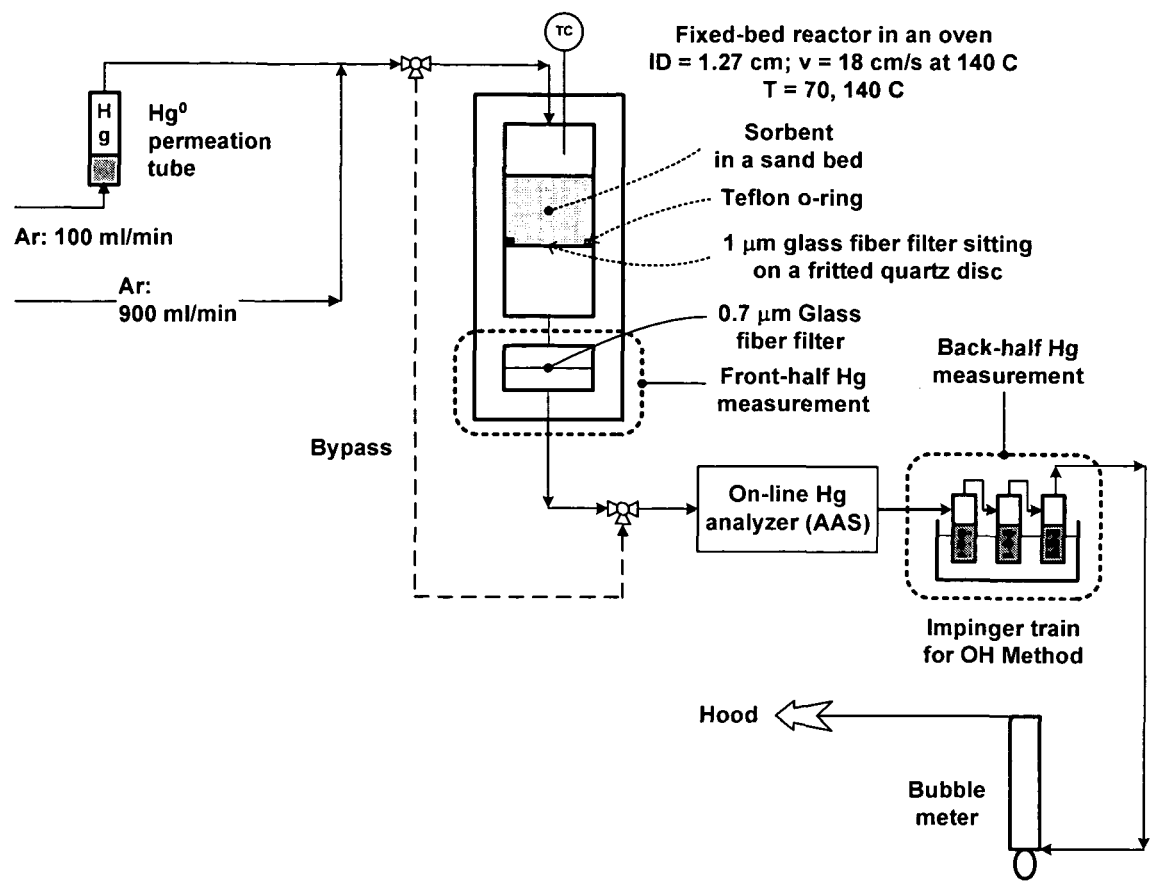
Figure 1. Schematic of a lab-scale fixed-bed system for $Hg^0$ adsorption test in $N_2$ flow.

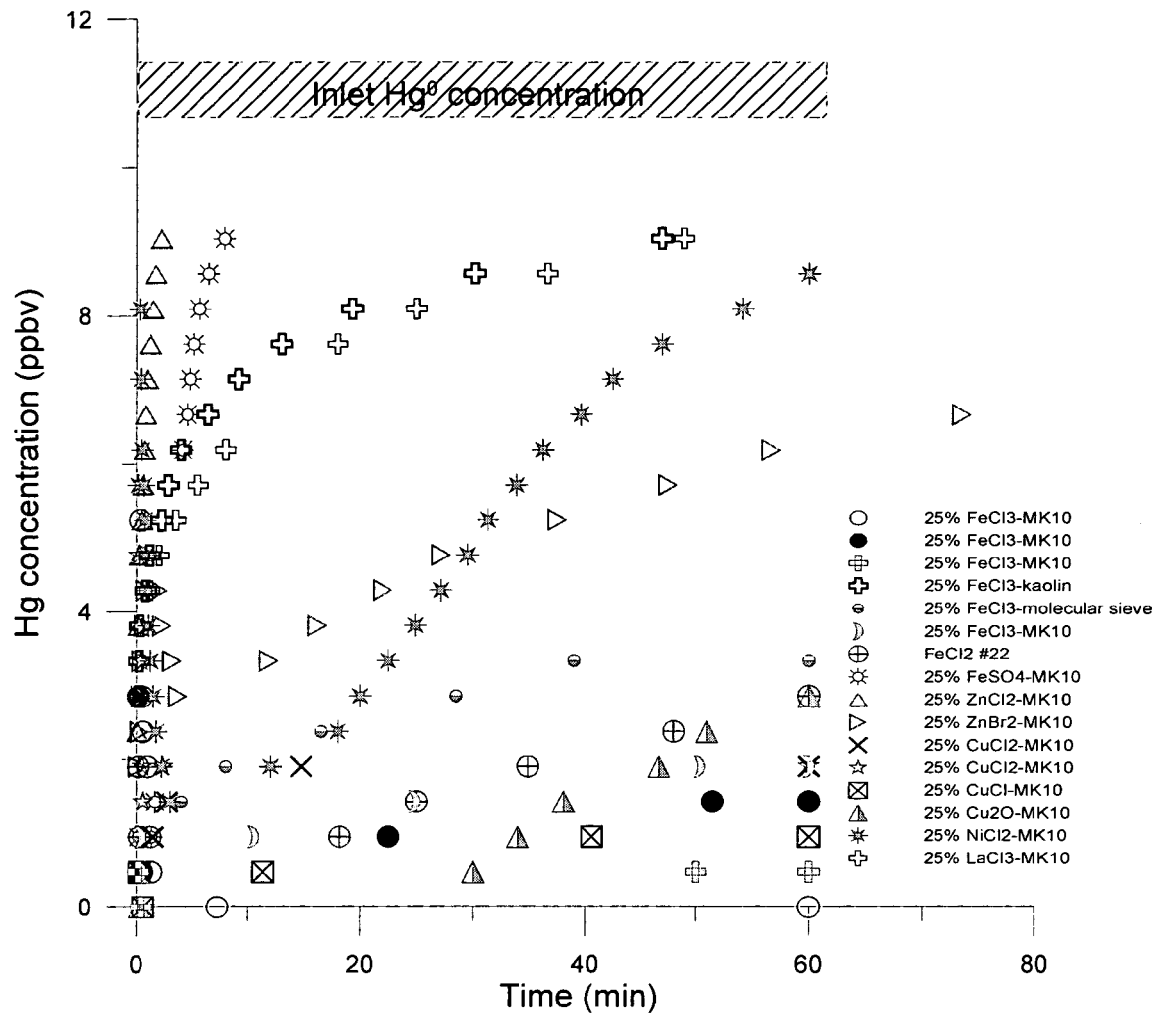
Figure 2. Breakthrough curves for synthetic oxidative sorbents tested in dry $N_2$ at 140 °C.

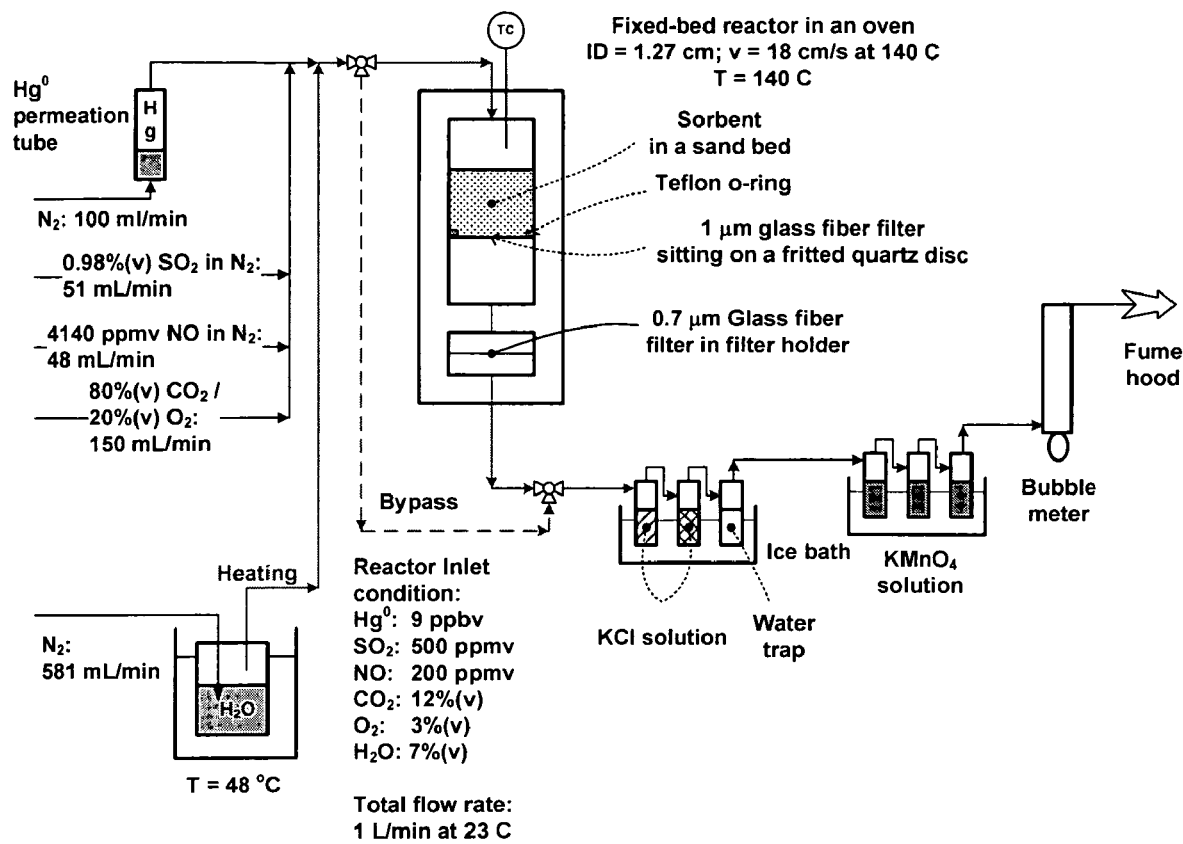
Figure 3. Schematic of a fixed-bed system for tests in a simulated flue gas.

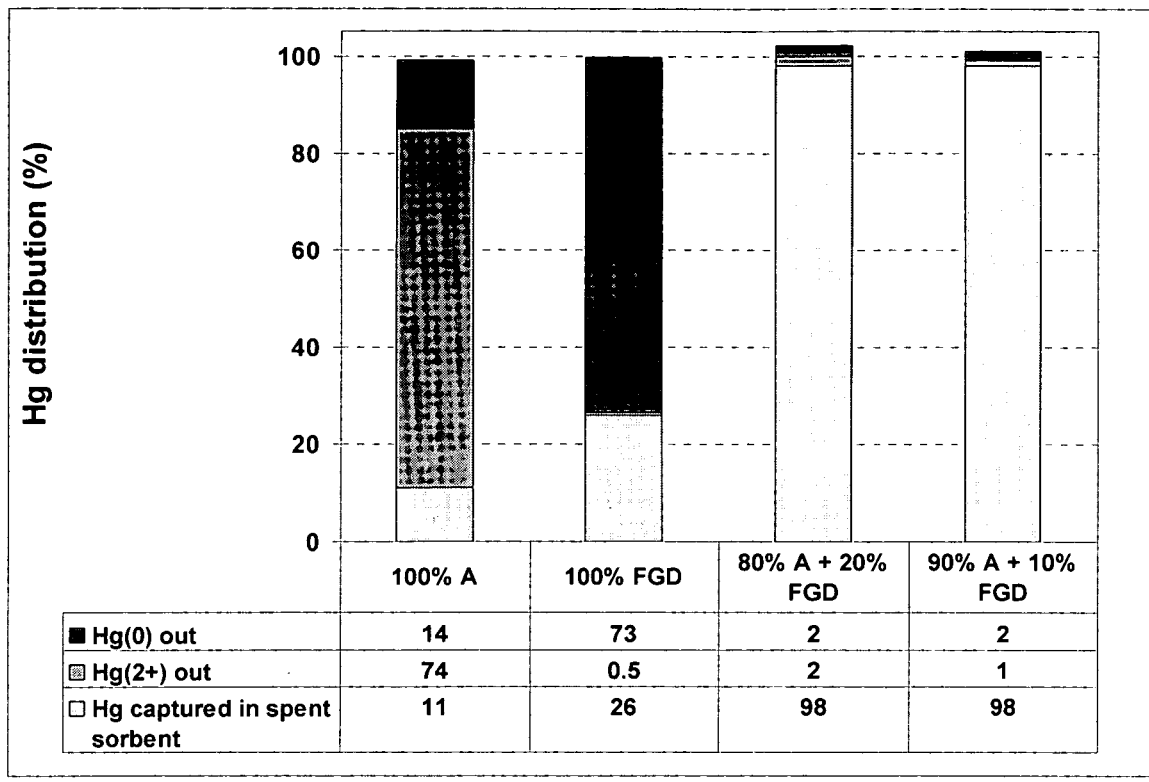
Figure 4. 1-hr mercury speciation results obtained from the Ontario Hydro Method.
(Note)
A = 10% $CuCl_2 \cdot 2H_2O$-MK10
FGD = Norit's FGD activated carbon

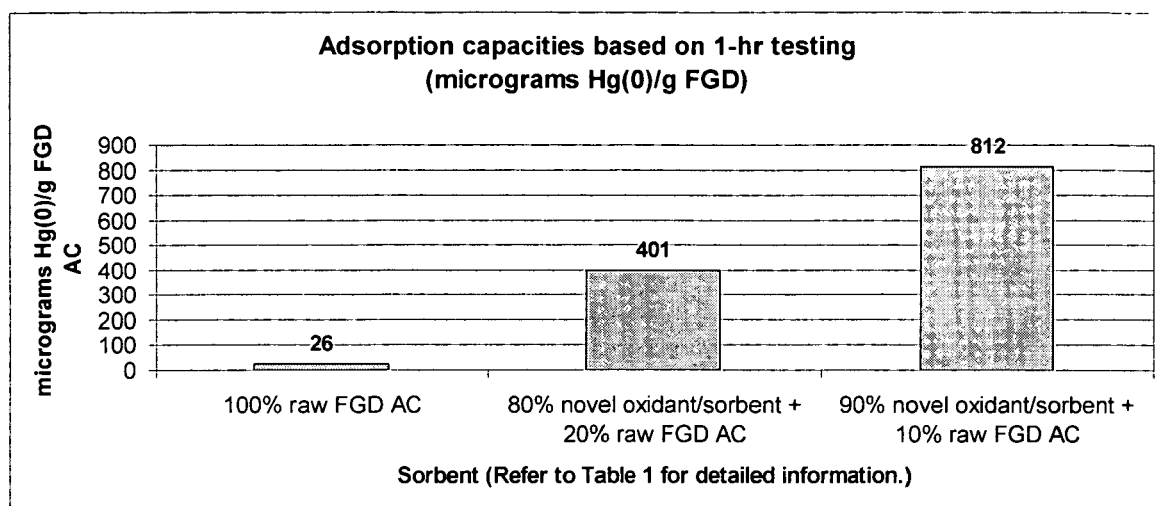
Figure 5. Adsorption capacities for three different oxidative sorbents obtained through 1-hour tests.

COMPOSITIONS AND METHODS FOR REMOVING MERCURY FROM MERCURY-CONTAINING FLUIDS

FIELD OF THE INVENTION

This invention relates generally to pollution control and more specifically, to adsorbents which substantially reduce the amount of mercury released into the environment by coal-fired utility plants and from other sources.

BACKGROUND OF THE INVENTION

Mercury and its compounds are significant environmental pollutants and major threats to human life and natural ecosystems. Mercury is of significant environmental concern because of its toxicity, persistence in the environment, and bioaccumulation in the food chain. The toxicity of soluble Hg ions and elemental Hg even in very dilute concentrations has been widely reported in the literature. Mercury is released readily into the environment from natural and anthropogenic sources. Because of its physical and chemical properties, mercury can also be transported regionally through various environmental cycles. Mercury Study Report to Congress, "Volume VIII: An Evaluation of Mercury Control Technologies and Costs," U.S. Environmental Protection Agency, EPA452/R-97-010, December, 1997.[1] Atmospheric deposition of mercury is reported to be the primary cause of elevated mercury levels in fish which is a potential threat to pregnant women and young children. 2004 EPA and FDA Advice, "What You Need to Know About Mercury in Fish and Shellfish," EPA-823-R-04-005, March, 2004.[2]

The annual global mercury emission is estimated at 5000 tons. Miller, S. J., et al., "Laboratory-Scale Investigation of Oxidative sorbents for Mercury Control," 94-RA 114A.01, presented at the 87th Annual Air and Waste Management Meeting, Cincinnati, Ohio, Jun. 19-24, 1994.[3]

The United States accounts for approximately 3% of such mercury emissions although this persistent pollutant travels globally via jet stream and gets converted to methyl mercury in the environment with high neurodevelopment toxicity. In the United States, coal-fired power utility plants are the biggest source of mercury emissions into the air, emitting a total of about fifty metric tons of mercury into the atmosphere annually, which is approximately thirty-three percent of all mercury emissions from the United States. Coal-fired combustion flue gas streams are of particular concern because of their composition that includes trace amounts of acid gases, such as $SO_2$, NOx, and HCl plus $CO_2$ and oxygen contents. Other sources of mercury emissions may include the chlor-alkali industry, metal sulfide or smelting, gold refining, cement production, fossil fuel combustion and incineration of sewage sludge or municipal garbage or the like.

The major chemical forms of the metal in the combustion flue gases are the elemental $Hg^0$ (zerovalent) and the oxidized mercury, $HgCl_2$, Hg(I) and Hg(II). Mercury vapor, $Hg^0$, is found predominantly in coal-fired boiler flue gas. Mercury can also be bound to fly ash in the flue gas. Mercury speciation (elemental or oxidized) and concentration is dependent on the source (e.g. the characteristics of the fuel being burned), process conditions and the constituents in the ensuing gas streams (e.g., $Cl_2$, HCl, $SO_2$, $NO_x$). The thermodynamically stable predominant form of mercury in the flue gases from coal-fired utilities is the elemental one ($Hg^0$). However, the oxidized $HgCl_2$ may be the major species from waste incinerators. Unlike the oxidized forms, the metal in the zero valent state is difficult to remove due its high volatility and low water solubility.

There is no currently available control method that efficiently collects all mercury species present in the flue gas stream. The existing mercury removal technologies involve scrubbing solution as in a wet flue gas desulfurization system, filtration and other inertial methods, electrostatic precipitation, and activated carbon based sorbents and a few other types of sorbents. For example, phyllosilicate mineral based sorbent has been described using a polyvalent metal sulfide prepared by ion exchange of tin, iron, titanium, zirconium and molybdenum to the support, and sequentially controlled addition of sulfide ions to the silicate substrate. However, the preparation and regeneration is tedious, costly, and dangerous making this technology unlikely to be commercialized.

Sorbent injection is one of the most promising technologies for application to the utility industry as virtually all coal-fired boilers are equipped with either an electrostatic precipitator (ESP) or a baghouse. Among various sorbents tested under the Department of Energy (DOE)'s field testing program, the most widely tested and promising sorbent is found to be activated carbon which has displayed the capability of capturing both elemental and oxidized mercury from flue gas streams. However, activated carbon has the following limitations: (1) activated carbon is expensive (e.g., Norit DARCO FGD activated carbon, DOE's benchmark sorbent, costs $0.42/lb); (2) it requires a very high carbon-to-mercury mass ratio (3,000-100,000) especially in flue gases with low HCl content such as subbituminous and lignite coals, and cannot achieve 90%+mercury removal. Mercury Study Report to Congress; EPA 452/R-97-003; U.S. Environmental Protection Agency, Office of Air Quality Planning and Standards: Washington, D.C., December 1997.[4]; and (3) it degrades the quality of captured fly ash and thereby adversely impacts its sale as a pozzolan additive. Feeley, T. J.; Brickett, L. A.; O'Palko, B. A.; Murphy, J. T. Field Testing of Mercury Control Technologies for Coal-Fired Power Plants. *Procd. of DOE/NETL's Mercury Control Technology R&D Program Review Meeting*, Pittsburgh, Pa., Jul. 12-14, 2005.[5]

Accordingly, there has been a need for novel oxidative sorbent compositions and methods to substantially reduce mercury emissions into the environment. There has been a need for novel oxidative sorbent compositions and method which efficiently and economically substantially reduce mercury in mercury containing fluids such as vapor mercury, the elemental form of mercury, from flue gas while preserving the quality of fly ash. Such oxidative sorbents and methods are needed to substantially reduce the total cost of mercury control technology. Additionally, novel compositions and methods are needed to reduce the amount of oxidative sorbent and oxidative sorbent injection equipment needed, and reduce costs for handling and disposing of spent oxidative sorbent. There is a still further need for efficient oxidative sorbent compositions that exhibit high adsorption capacity and can tolerate the presence of acidic gases. There is an additional need for novel oxidative sorbent compositions and methods that are less expensive and more efficient than activated carbon alone at removing vapor mercury from flue gas and may be used in combination with other mercury-removal technologies. The present invention fulfills these needs and provides other related advantages.

SUMMARY OF THE INVENTION

The present invention is concerned with an oxidative sorbent composition, a method of making a oxidative sorbent composition, and a method of using the oxidative sorbent composition for the substantial removal of mercury from a mercury-containing fluid. As used herein, the term "fluid" denotes gas, liquid, vapor, and combinations thereof.

The oxidative sorbent composition generally comprises one or more silicates capable of cation exchange with active metal cations, a plurality of active metal cations presenting at the material surface, and a plurality of counter anions. The sorbent composition may further comprise activated carbon.

The one or more silicates may be natural or synthetic. The one or more silicates may be selected from the group consisting of clays such as montmorillonite, laumonite, bentonite, Mica, vermiculite and kaolinite, and from silica gels, natural and synthetic molecular sieves, zeolites, and ashes from stoker- and pulverized coal-fired boilers. The particle size of the preferred silicates used ranges from about 1 to about 100 micrometers The preferred active metal cations may be selected from the group consisting of Cu(I), Cu(II), Fe(II), Fe(III), Ni(II) and Zn(II) and combinations thereof (a monovalent copper ion, a bivalent copper ion, a bivalent iron ion, a trivalent iron ion, a bivalent nickel ion, a bivalent zinc ion, and their counter anions chloride ($Cl^{-1}$), bromide ($Br^{-1}$), and sulfate ($SO_4^{-2}$).

It is believed that the oxidative sorbent composition functions to facilitate mercury removal from the mercury-containing fluid using oxidative reactions of elemental mercury— $Hg^0$ in the temperature range of about 50 to about 350° C. and sequential adsorption of Hg(I) or Hg(II) on the surfaces of the one or more silicates. Zero valent Hg is relatively more difficult to be adsorbed than Hg(I) and Hg(II) due to its very low affinity with other materials.

Generally, the immobilization of metal halides and/or sulfates is accomplished on the surface of the silicates by suspending, grinding or otherwise contacting the metal halides/sulfates with the one or more silicates to produce the metal-impregnated silicates which can be then collected as powdered solid sorbents. Activated carbon may be added to the metal-impregnated silicates.

The method of using the novel oxidative sorbent compositions for the capture of mercury from a flue gas stream is also provided and comprises the steps of injecting a porous oxidative sorbent into the flue gas stream, capturing the mercury onto the porous oxidative sorbent when the oxidative sorbent is exposed to the flue gas stream, and removing and disposing of the spent oxidative sorbent under a set of removal conditions that meets federal and state disposal criteria and that includes stabilization of the spent sorbent by known methods and removal of fly ash. The term "spent oxidative sorbent" as used herein means sorbent that includes captured mercury.

Other features and advantages of the present invention will become apparent from the following more detailed description, taken in conjunction with the accompanying drawings which illustrate, by way of example, the principles of the invention.

BRIEF DESCRIPTION OF THE DRAWINGS

The accompanying drawings illustrate the invention. In such drawings:

FIG. 1 is a schematic of a lab-scale fixed-bed system used for Hg(0) adsorption tests in $N_2$ flow with an online mercury analyzer for screening purpose;

FIG. 2 is a graph illustrating the breakthrough curves for some of the synthetic oxidative sorbents tested in dry $N_2$ using the system in FIG. 1 at 140° C.;

FIG. 3 is another schematic of a fixed-bed system for tests under simulated flue gas conditions;

FIG. 4 illustrates mercury speciation analysis results obtained using the Ontario Hydro Method through 1-hr fixed-bed tests under a simulated flue gas of the subbituminous and lignite coals; and FIG. 5 illustrates the adsorption capacities for three different oxidative sorbents obtained through 1-hour fixed-bed tests.

DETAILED DESCRIPTION OF THE PREFERRED EMBODIMENTS

The present invention is concerned with an oxidative sorbent composition, a method of making an oxidative sorbent composition, and a method of using the oxidative sorbent composition for the substantial removal of mercury from a mercury-containing fluid.

In accordance with a first embodiment of the present invention, a novel oxidative sorbent composition suitable for removing mercury from mercury-containing fluids is provided. As used herein, the term "fluid" denotes gas, liquid, vapor, and combinations thereof. Coal-fired flue gas is one such gas. The oxidative sorbent composition generally comprises one or more silicates capable of cation exchange with active metal cations, a plurality of active metal cations presenting at the material surface, and a plurality of counter anions. The oxidative sorbent composition may further comprise activated carbon.

As used herein, the one or more silicates may be a natural or synthetic silicate selected from the group consisting of clays such as montmorillonite, laumonite, bentonite, Mica, vermiculite and kaolinite, and from silica gels, natural and synthetic molecular sieves, zeolites, and ashes from stoker- and pulverized coal-fired boilers. Clays have been already been studied for catalytic applications because they occur abundantly in nature and because of their high surface area in the range of approximately 50 to 350 $m^2/g$, and adsorptive and ion-exchange properties. Moreover, clays are relatively inexpensive. In addition, fly ashes from stoker fired boilers as well as from pulverized coal-fired boilers, including ashes from the combustion of bituminous coals, subbituminous coals and lignite coals can be used as substrate materials. The particle size of the preferred silicates ranges from about 1 to about 100 micrometers, which makes them easier to be collected after adsorption in an electrostatic precipitator (ESP) or fabric filter and minimizes the amount of needed oxidative sorbent. Fly ashes may be larger, up to about 200 microns. The average particle size of fly ash is about 20 microns.

The preferred active metal cations may be selected from the group consisting of Cu(I), Cu(II), Fe(II), Fe(III), Ni(II) and Zn(II) and combinations thereof (a monovalent copper ion, a bivalent copper ion, a bivalent iron ion, a trivalent iron ion, a bivalent nickel ion, a bivalent zinc ion, and their counter anions chloride ($Cl^{-1}$), bromide ($Br^{-1}$), and sulfate ($SO_4^{-2}$). Chloride is the most common and economical choice as the counter ion for oxidative metal species such as Fe(III) and Cu(II) and has already been investigated to enhance the mercury adsorption capacity of activated carbon by chemisorptions. Spent etching solution containing $CuCl_2$ from the Printed Circuit Board industry in various weight compositions doped on inexpensive clay as hereinafter described provides an efficient and inexpensive oxidative sorbent to substantially reduce mercury in mercury-containing fluids.

The metal cations may be immobilized on the porous surface of a host silicate(s) by ion exchange. The silicates have a layered structure and immobilized active metal salts, with Cu(I), Cu(II), Fe(II), Fe(III), Ni(II) and Zn(II) on their surface.

The activated carbon may be added in an amount from about 1 to about 30% of the metal-impregnated silicates, preferably about 10% to greatly enhance mercury adsorption. The activated carbon (FGD) is available from Norit, Marshall, Tex.

While not wishing to be bound by any one theory, it is believed that the oxidative sorbent composition functions to facilitate removal of the mercury from the mercury-containing fluid using oxidative reactions of elemental mercury—$Hg^0$ in the temperature range of about 50° C. to about 350° C. Higher valent metal species can be doped on the surface of porous silicates and function as oxidants to oxidize $Hg^0$ in the temperature range of about 50-350° C.; oxidized forms of Hg, e.g. Hg(I) and Hg(II) can be more easily captured on the porous surface of the one or more silicates.

Active oxidative metal halides and/or metal sulfates may be impregnated onto the silicate mineral supports to oxidize Hg(0) to Hg(I) or Hg(II), and to capture the oxidized Hg species by adsorption on the porous surface of the one or more silicates with or without the activated carbon. It is postulated that the chemical reaction/adsorption is responsible for the oxidation of elemental mercury and the subsequent adsorption of the oxidized forms of mercury on the porous surface of the silicates.

A method for making the novel oxidative sorbent composition is also provided. Generally, the immobilization of metal halides and/or sulfates is accomplished on the surface of the mineral oxide by suspending, grinding or otherwise contacting the metal halides/sulfates with the one or more silicates to produce the metal impregnated silicates which can be then collected as powdered solid oxidative sorbents. Activated carbon may be added to the metal impregnated silicates. Exemplary preparation is as follows:

1. Doping the metal halides and/or sulfates (including CuCl, CuBr, $CuCl_2$, $CuBr_2$, $CuSO_4$, $FeCl_2$, $FeCl_3$, $FeSO_4$, $Fe_2(SO_4)_3$, $ZnCl_2$, $ZnBr_2$, $NiCl_2$, $NiSO_4$) to powdered minerals (silicates) (particle size ranging from about one to about one hundred micrometers) via impregnation by contacting the suspension of the silicate(s) with metal halides/sulfate in the aqueous phase solution (1-35% w/w metal halides/sulfate on mineral).

Preparation of a 5% Copper Chloride Impregnated Oxidative Sorbent

Add 0.50 g of copper chloride $CuCl_2$ (Aldrich Chemical. Co., Milwaukee, Wis., USA) to a suspension of 4.95 g of montmorillonite K 10 clay (Aldrich Chemical. Co. Milwaukee, Wis., USA) mixed in 80 mL of distilled water. Maintain the mixture at room temperature (~20° C.) for 4 hours with continuous stirring. The resulting suspension was filtered and the solid material dried at 100° C. under vacuum for 16 hrs to prepare 5% copper chloride impregnated oxidative sorbent ($CuCl_2$-MK10).

2. Doping the metal halides and/or sulfates (including CuCl, CuBr, $CuCl_2$, CuBr2, $CuSO_4$, $FeCl_2$, $FeCl_3$, $FeSO_4$, $Fe_2(SO_4)_3$, $ZnCl_2$, $ZnBr_2$, $NiCl_2$, $NiSO_4$) to powdered minerals (particle size ranging from about one to about one hundred micrometers) by contacting the suspension of one or more silicates with metal halides/sulfate in acetone solution (Aldrich Chemical Co., Milwaukee, Wis., USA, A.C.S. grade) (1-35% w/w metal halides/sulfate on mineral).

Preparation of a 5% Copper Chloride Impregnated Oxidative Sorbent

Add 0.50 g of copper chloride $CuCl_2$ (Aldrich Chemical. Co., Milwaukee, Wis., USA) to the suspension of 4.95 g montmorillonite K 10 clay (Aldrich Chemical Co. Milwaukee, Wis., USA) in 80 mL of acetone, the mixture was kept at 50° C. for 2 hrs. The solvent was then removed from the resulting suspension below 50° C. using a rotary evaporator (BÜCHI Rotavapor R-200, BÜCHI Laboratory Equipment, Switzerland). 5% copper chloride impregnated montmorillonite clay was obtained as light blue solid.

Preparation of a 5% Copper Chloride/Copper Sulfate (1/1) Impregnated Kaolin

Add 0.25 g of copper chloride $CuCl_2$ (Aldrich Chemical. Co., Milwaukee, Wis., USA), and 0.25 g of copper sulfate $CuSO_4$ (Aldrich Chemical. Co., Milwaukee, Wis., USA) to a suspension of 4.95 g of Kaolin (Fisher Scientific. Chicago, USA) in 80 mL of acetone and keeping the mixture at 50° C. for 2 hrs. The solvent was then removed from the resulting suspension below 50° C. using a rotary evaporator (BÜCHI Rotavapor R-200, BÜCHI Laboratory Equipment, Switzerland). 5% copper chloride/copper sulfate (1/1) impregnated kaolin was obtained as light blue solid.

3. Dry impregnation (or physical mixing)

Preparation of a 5% Copper Chloride Impregnated Oxidative Sorbent

Mix 0.50 g of copper chloride $CuCl_2$ (Aldrich Chemical. Co. Milwaukee, Wis., USA) with 4.95 g montmorillonite K 10 clay using a mortar and pestle or the like and grinding together thoroughly with the pestle to obtain 5% copper chloride impregnated montmorillonite clay as the oxidative sorbent.

Although the preparation of a 5% copper chloride impregnated montmorillonnite K 10 oxidative sorbent and a 5% copper chloride/copper sulfate (1/1) impregnated kaolin oxidative sorbent have been described, it is to be appreciated that an oxidative sorbent composition comprised of other silicates and other metal halides/sulfates and combinations thereof may be generally prepared by combining the support components, described above, together in appropriate proportions, described above, by any suitable method or manner known in the art which provides impregnation of the one or more silicates by one or more metal halides/metal sulfate. A preferred oxidative sorbent has an average surface area in the range of about 50 to about 350 $m^2/g$, preferably about 250 $m^2/g$.

Activated carbon in an amount of about 1% to about 30% of the metal impregnated silicates may be added to the metal-impregnated silicates, preferably about 10% to about 30%. Although addition of the activated carbon to metal-impregnated silicates is described, it is to be appreciated that the activated carbon may be added to the silicate(s) at the same time as the metal halides/sulfates. The method of using the novel oxidative sorbent compositions for mercury capture from mercury-containing fluid is also provided and comprises the steps of:

Injecting a oxidative sorbent into the mercury-containing fluid;

Capturing the mercury onto the porous oxidative sorbent when the oxidative sorbent is exposed to the mercury-containing fluid; and Removing and disposing of the spent oxidative sorbent.

The capturing step includes oxidizing the elemental mercury (Hg(0)) inside the porous oxidative sorbent and capturing the oxidized mercury (Hg(+) and/or Hg(2+)) onto the oxidative sorbent when the oxidative sorbent is exposed to the flue gas stream.

The contacting of the mercury-containing fluid and oxidative sorbent composition is carried out under a set of removal conditions that include injection of the oxidative sorbent into a flue gas stream from −100 to +100 inches of water static pressure, gas velocities from 1 to 100 ft/s, and gas-sorbent residence times from 0 to 60 min. The removal conditions preferably include a temperature in the range of about 50-350° C., more preferably about 140° C. for the best mercury removal. When the oxidative sorbent composition is contacted with the mercury containing fluid such as a flue gas stream, a significant amount of elemental and/or oxidized mercury present in the mercury containing fluid is removed from such a fluid. After separation of the spent oxidative sorbent from the fluid effluent of, for example, the coal burning facility, the spent oxidative sorbent is disposed of in a manner which meets federal and/or state disposal regulations.

The mercury capture performances for the oxidative sorbents disclosed herein are summarized as follows:

1. Lab-Scale Fixed-Bed Tests in $N_2$ Flow

A lab-scale fixed-bed system as shown in FIG. 1 was used to identify potential oxidative sorbent candidates in $N_2$ flow. The effluent Hg(0) concentrations at the outlet of the reactor were monitored by an online mercury analyzer, which can detect only Hg(0) and cannot detect any oxidized mercury. Therefore, the Hg(0) concentration differences at the inlet and outlet of the reactor may result from adsorption onto an oxidative sorbent or oxidation.

FIG. 2 shows the breakthrough curves of some of the synthetic oxidative sorbents tested in $N_2$ flow at 140° C. Since the breakthrough curves show effluent Hg(0) concentrations with respect to time, good oxidative sorbent candidates are required to have low outlet Hg(0) concentrations over a long period of time. The oxidative sorbents shown in FIG. 2 demonstrate moderate (e.g., 25% $ZnCl_2$-MK10) to excellent (e.g., 25% $CuCl_2$-MK10) capacities of Hg(0) adsorption/oxidation.

2. Lab-Scale Fixed-Bed Tests in a Simulated Flue Gas Flow

Oxidative sorbents were evaluated at 140° C. in a simulated flue gas system as shown in FIG. 3. The simulated flue gas representing the combustion of subbituminous and lignite coals consisted of 3% (v) $O_2$, 12% (v) $CO_2$, 7% (v) $H_2O$, 500 ppmv $SO_2$, 200 ppmv NO, and 9 ppbv Hg(0) balanced with $N_2$.

All of the tests were conducted during an hour at 140° C. in the fixed-bed system, and their results are summarized in Table 1. The mass balance closure for all runs was in a reasonably acceptable range (87-106%), and the amount of mercury captured in spent oxidative sorbents was determined after performing the digestion procedures described in the Ontario Hydro Method. ASTM Method D6784-02, "Standard Test Method for Elemental, Oxidized, Particle-bound and Total Mercury in Flue Gas Generated from Coal-Fired Stationary Sources (Ontario Hydro Method)",[6] incorporated by reference herein. HCl gas was not added to the simulated flue gas for all the runs in order to eliminate the well-known heterogeneous mercury oxidation (mercury adsorption on activated carbon after in-situ HCl gas impregnation on activated carbon). Carey, T. R.; Hargrove Jr., O. W.; Richardson, C. F.; Chang, R.; Meserole, F. B. Factors Affecting Mercury Control in Utility Flue Gas Using Activated Carbon. *J. Air & Waste Manage. Assoc.* 1998, 48, 1166.[7] However, the performance of the oxidative sorbent proved not to be affected by an addition of HCl gas from further testing.

The oxidative sorbent, $CuCl_2.2H_2O$-MK10, which showed the best performance in $N_2$ flow, was evaluated at 140° C. in Run 1. It showed 1% of mercury capture in the oxidative sorbent, and approximately 74% of the mercury emissions from the bed were captured as oxidized mercury in the second filter placed in a filter holder, a water condensation impinger, and KCl solution impingers. Run 1 showed that mercury adsorption in the oxidative sorbent was relatively small (approximately 10% of total Hg(0) injected into the system), and a significant majority of the inlet Hg(0) vapor was converted to the oxidized mercury form and adsorbed onto the solid phase (filter) or absorbed into the aqueous phase bubbler where water or KCl solution was placed. While 11% of Hg(0) was captured, most of the influent Hg(0) was found to be converted to oxidized mercury. In terms of Hg(0) removal, 86% of Hg(0) was removed. Therefore, the novel oxidative sorbent was found to be an excellent Hg(0) oxidant.

In Run 2, Norit FGD activated carbon (DOE's benchmark oxidative sorbent) was tested in order to determine its Hg(0) adsorption capacity in the absence of HCl in the gas phase. These tests showed 26% sorption capacity and negligible oxidation capability. In earlier tests, activated carbon did not work well for Hg(0) removal without HCl gas in any type of simulated flue gases. These results in the absence of HCl gas corroborate low mercury removal observed from the flue gases of PRB subbituminous and lignite coals in the DOE's Mercury Control Field Testing Program[5] and another fixed-bed study[7].

Runs 3 and 4 were performed to examine the possibility of capturing the oxidized mercury created from the use of the novel oxidative sorbent by the in-situ adsorption onto activated carbon. A stannous chloride (a reducing agent, $SnCl_2$) solution was used for Run 3 for total mercury analysis after the fixed-bed reactor so that all the mercury emitted after the bed would be converted to Hg(0), and could be collected in the downstream $KMnO_4$ solution impingers. Run 3 used 20% (10 mg) of the FGD activated carbon after uniformly mixing it with 80% (40 mg) of the 10% $CuCl_2.2H_2O$-MK10 in 6 g of sand. Results showed that almost all Hg(0) (98% of the total 87% recovered mercury from all impinger solutions, and digestions of filters and solids) was captured in the mixture of the two materials (FGD activated carbon and 10% $CuCl_2.2H_2O$-MK10) with 20% addition of the FGD activated carbon. In Run 4, the amount of FGD activated carbon was reduced to the half that of Run 3, 10% (5 mg), and was tested under the same conditions. The 10% addition of the activated carbon also demonstrated almost the same performance in Hg(0) removal as that of Run 3 under the same test conditions.

TABLE 1

1-hr testing results in a fixed-bed reactor at 140° C.

| Run | Oxidative sorbent | Loading (mg oxidative sorbent in 6 g sand) | Hg from spent oxidative sorbent + filter (%) | Hg from 2$^{nd}$ filter in filter holder (%) | Hg in water condensation (%) | Hg in tubing (%) | Hg in KCl (%) | Hg in $KMnO_4$ (%) | Mass balance closure based on inlet Hg (%) |
|---|---|---|---|---|---|---|---|---|---|
| 1 | A** | 50 | 11 | 19 | 28 | 0 | 27 | 14 | 100 |
| 2 | AC** | 50 | 26 | N/A | 0 | 0 | 0.5 | 73 | 106 |
| 3 | A + AC* | 40 + 10 | 98 | N/A | 0 | 0 | N/A | 2 | 87 |
| 4 | A + AC** | 45 + 5 | 98 | 1 | 0 | 0 | 1 | 2 | 90 |

(Note)
A = 10% $CuCl_2 \cdot 2H_2O$-MK10
AC = Norit's FGD activated carbon
*Impinger configuration for total mercury analysis: 2 $SnCl_2$ → 1 water trap → 3 $KMnO_4$
**Impinger configuration for mercury speciation analysis: 2 KCl → 1 water trap → 3 $KMnO_4$ From the above test results, the novel oxidative sorbent proved to exhibit excellent performance and selectivity in removing Hg(0). The mercury speciation results obtained using the Ontario Hydro Method in Table 1 are illustrated in FIG. 4. It is anticipated that injection of the novel oxidative sorbent in conjunction with activated carbon could achieve 90%+mercury removal in a cost-effective way, especially for flue gases with relatively high Hg(0) content.

An adsorption capacity of each oxidative sorbent was determined using the digestion procedure described in the Ontario Hydro Method, and is shown in FIG. 5. It shows that the adsorption capacity of the oxidative sorbent can be greatly enhanced by the addition of FGD activated carbon. These results obtained from the fixed-bed tests are expected to be replicated through oxidative sorbent injection prior to a fabric filter system in a large scale system.

The injection of the oxidative sorbent in conjunction with activated carbon can achieve 90%+mercury removal regardless of the mercury speciation present in the flue gas. As the novel oxidative sorbent has been shown to have excellent oxidant capability, it may be injected with activated carbon to achieve 90%+mercury removal and collected in particulate control devices such as ESPs or fabric filters. As an alternative, only the noncarbonaceous oxidative sorbent may be injected prior to a wet scrubber if it is available, and oxidized mercury can be readily removed in the wet scrubber. In this scenario, the oxidative sorbent would be injected upstream of the existing ESP and captured, while the resultant highly oxidized mercury would be absorbed into the downstream wet scrubber. Therefore, the method of using the disclosed oxidative sorbents may be in combination with conventional air pollution control technologies such as electrostatic precipitation, wet scrubbing, filtration and other inertial methods in order to utilize the existing air pollution control devices.

From the foregoing, it is to be appreciated that the novel composition and methods are efficient (high mercury uptake capacity) and economical (cost effective) at substantially removing mercury from mercury-containing fluids, including mercury from a wide range of flue gases. The estimated material costs of the oxidative sorbent compositions made from silicates and a spent waste etching solution containing $CuCl_2 \cdot 2H_2O$ from the Printed Circuit Board industry is less than half of the cost of activated carbon. The oxidative sorbents are expected to result in a significant cost reduction in mercury control (>50%) while having a negligible effect on fly ash byproduct sales and use.

Although a particular embodiment of the invention has been described in detail for purposes of illustration, various modifications may be made without departing from the spirit and scope of the invention. Accordingly, the invention is not to be limited, except as by the appended claims.

We claim:

1. An oxidative sorbent composition for the substantial removal of mercury from mercury-containing fluids comprising:
    a matrix material selected from one or more silicates;
    at least one metal halide impregnated in the matrix material for oxidizing $Hg^0$ present in the mercury-containing fluids to one of Hg(I) and Hg(II); and
    about 1% to about 30% activated carbon.

2. The oxidative sorbent composition of claim 1, wherein the at least one metal halide is selected from the group consisting of $CuCl$, $CuBr$, $CuCl_2$, $CuBr_2$, $FeCl_2$, $FeCl_3$, $ZnCl_2$, $ZnBr_2$, and $NiCl_2$.

3. The oxidative sorbent composition of claim 1, wherein the one or more silicates are selected from the group consisting of clays such as montmorillonite, laumonite, bentonite, mica, vermiculite and kaolinite, and from silica gels, natural and synthetic molecular sieves, zeolites, and ashes from stoker and pulverized coal-fired boilers.

4. The oxidative sorbent composition of claim 1, further comprising activated carbon.

5. The oxidative sorbent composition of claim 1, wherein the mercury-containing fluids comprise acidic flue gas.

6. The oxidative sorbent composition of claim 1, wherein the composition comprises about 1 to about 35% (wt) of at least one metal halide and from about 65 to about 99% (wt) matrix material.

7. The oxidative sorbent composition of claim 1, wherein the matrix material has a particle size range of about one to about 100 microns.

8. The oxidative sorbent composition of claim 7, wherein the matrix material has an average particle size of less than about 32 microns.

9. A method for preparation of an oxidative sorbent composition for use in substantially removing mercury from fluids, comprising the steps of:
    contacting one or more silicates with at least one metal halide, wherein the at least one metal halide is in a solution, to make metal-impregnated silicates for oxidizing $Hg^0$ to one of Hg (I) and Hg(II);
    adding activated carbon to the metal-impregnated silicates; and
    removing the solution from the oxidative sorbent composition;
    wherein the at least one metal halide is selected from the group consisting of $CuCl$, $CuBr$, $CuCl_2$, $CuBr_2$, $FeCl_2$, $FeCl_3$, $ZnCl_2$, $ZnBr_2$, and $NiCl_2$; and
    wherein the one or more silicates are selected from the group consisting of clays such as montmorillonite, laumonite, bentonite, Mica, vermiculite and kaolinite, and from silica gels, natural and synthetic molecular sieves, zeolites, and ashes from stoker—and pulverized coal-fired boilers.

10. The method of claim 9, wherein the at least one metal halide is only $CuCl_2$.

11. The method of claim 9, wherein the one or more silicates is montmorillonite.

12. The method of claim 9, wherein the solution is an aqueous solution of about 6.25% to about 20% of the at least one metal halide in water.

13. The method of claim 9, wherein the solution is an acetone solution of about 6.25% to about 20% of the at least one metal halide in acetone.

14. The method of claim 9, wherein the one or more silicates have an average particle size ranging from about 1 to about 100 micrometers.

15. A method to capture mercury from mercury-containing fluid, comprising the steps of:
    contacting the mercury-containing fluid with an oxidative sorbent, the oxidative sorbent comprising one or more silicates impregnated with at least one metal halide for oxidizing $Hg^0$ to one of Hg(I) and Hg(II);
    oxidizing $Hg^0$ present in the mercury-containing fluid to one of Hg(I) and Hg(II) with the metal halide; and
    capturing the Hg(I) and Hg(II) onto at least one of the silicates of the oxidative sorbent;
    wherein the at least one metal halide is selected from the group consisting of $CuCl$, $CuBr$, $CuCl_2$, $CuBr_2$, $FeCl_2$, $FeCl_3$, $ZnCl_2$, $ZnBr_2$, and $NiCl_2$; and
    wherein the one or more silicates are selected from the group consisting of clays such as montmorillonite, laumonite, bentonite, Mica, vermiculite and kaolinite, and from silica gels, natural and synthetic molecular sieves, zeolites, and ashes from stoker—and pulverized coal-fired boilers.

16. The method of claim 15, wherein the oxidative sorbent further comprises activated carbon and wherein the silicate is montmorillonite clay and the metal halide is $CuCl_2$.

17. A method to capture mercury from a flue gas stream containing elemental and ionic mercury, comprising the steps of:

injecting a porous oxidative sorbent into the flue gas stream, wherein the porous oxidative sorbent comprises:

at least one metal halide selected from the group consisting of CuCl, CuBr, $CuCl_2$, $CuBr_2$, $FeCl_2$, $FeCl_3$, $ZnCl_2$, $ZnBr_2$, and $NiCl_2$ for oxidizing $Hg^0$ to one of Hg(I) and Hg(II); and a matrix material selected from one or more silicates selected from the group consisting of clays such as montmorillonite, laumonite, bentonite, Mica, vermiculite and kaolinite, and from silica gels, natural and synthetic molecular sieves, zeolites, and ashes from stoker—and pulverized coal-fired boilers;

oxidizing $Hg^0$ present in the flue gas stream to one of Hg(I) and Hg(II) with the metal halide;

capturing the oxidized mercury onto the porous oxidative sorbent when the oxidative sorbent is exposed to the flue gas stream; and removing and disposing of the spent oxidative sorbent.

18. A process for treating the surface of one or more silicates for ion exchange comprising:

contacting the surface of montmorillonite clay with $CuCl_2$ in acetone solution, wherein the $CuCl_2$ is used to oxidize $Hg^0$ present in a flue gas stream to one of Hg(I) and Hg(II).

\* \* \* \* \*